Jan. 27, 1970 W. F. WISNIEWSKI 3,492,581
EMERGENCY CALLING SYSTEM
Filed May 24, 1967 9 Sheets-Sheet 5

WILLIAM F. WISNIEWSKI
INVENTOR

Jacobi & Davidson
ATTORNEYS

Jan. 27, 1970　　　W. F. WISNIEWSKI　　　3,492,581
EMERGENCY CALLING SYSTEM
Filed May 24, 1967　　　　　　　　　　　　　　　9 Sheets-Sheet 6

WILLIAM F WISNIEWSKI
INVENTOR
Jacob & Danchou
ATTORNEYS

Jan. 27, 1970      W. F. WISNIEWSKI      3,492,581

EMERGENCY CALLING SYSTEM

Filed May 24, 1967      9 Sheets-Sheet 7

WILLIAM F WISNIEWSKI
INVENTOR,

Jacobs & Davidson
ATTORNEYS

United States Patent Office 3,492,581
Patented Jan. 27, 1970

3,492,581
EMERGENCY CALLING SYSTEM
William F. Wisniewski, Niagara Falls, N.Y., assignor to Peninsula Research & Development Corporation Limited, Ridgeway, Ontario, Canada, a corporation of Canada
Filed May 24, 1967, Ser. No. 640,949
Int. Cl. H04b 7/00
U.S. Cl. 325—64                     6 Claims

ABSTRACT OF THE DISCLOSURE

An emergency calling system including a plurality of transmitters at spaced locations, for example, along a highway, and each capable of transmitting coded signals identifying the location. A common receiving station is provided capable of decoding the coded signals whereby the respective emergency at the particular location can be dealt with.

---

This invention relates to an emergency calling system and is particularly applicable to an emergency highway calling system.

On highways, especially on major highways such as turnpikes and superhighways, vehicles often break down or are involved in an accident. This can happen many miles from the nearest car service station or ambulance station and, in order to obtain assistance, a message has to be sent by way of another vehicle or, alternatively, someone has to walk along the highway if no other vehicle is in sight. As can be appreciated, this involves considerable delay before assistance is obtained and in the case of a serious accident where someone is injured, the delay may be fatal.

Systems have been designed to facilitate the calling of assistance, e.g. either an ambulance or a repair truck, in the least possible time but these systems normally involve a telephone system wherein telephones are located at intervals along the highway. Telephone lines or cables have, therefore, to be provided along the highway and this could involve a high installation cost. Furthermore, in some cases, it may be impossible to install telephone lines, thus no emergency calling system would be available at those places.

It is an object of the present invention to provide an improved emergency calling system which is easier to establish than the above-mentioned telephone system and which, furthermore, may be used in places where a telephone system would be impossible to install or uneconomical.

Accordingly, there is provided an emergency calling system for permitting an emergency signal to be sent from any one of a plurality of spaced locations to a common receiving station comprising: (a) a radio transmitter installation located at each of said locations; (b) a radio receiver located at said receiving station and capable of receiving radio signals transmitted by said transmitter installations; and (c) said radio signals each including coded information representative of the respective transmitter installation and emitting the received radio signals whereby each respective transmitter is identifiable at said common receiving station.

More particularly, there is provided an emergency highway calling system wherein each transmitter installation includes: (a) a transmitter unit for transmitting radio signals via an antenna system; (b) a binary encoder unit for supplying coded information to said transmitter for transmission; (c) a modulator unit interposed between said binary encoder unit and said transmitter unit; and (d) a relay switch unit adapted to initiate operation of said binary encoder unit and said transmitter unit in response to a particular occurrence.

The invention will now be described, by way of example, with reference to the accompanying drawings in which.

In an emergency highway calling system according to the present invention, there is provided at selected locations spaced at intervals along a highway, a transmitter installation incorporating a radio transmitter operable in either of two channels in the citizens' band range of frequencies or in the newly proposed emergency band which is adjacent in frequency to the citizens' band. The transmitter installation may be mounted in any suitable casing but may well be mounted in a casing similar to that used in present day parking meters. However, it would preferably be provided with two buttons on its face. By pushing one of the buttons, it could be arranged that a signal was transmitted on one channel to a central receiving station so that a repair truck may be sent from the nearest service station (this may, in fact, be the central receiving station). Pushing the second button would cause the transmitter to transmit on the other of its two channels whereby a signal would be transmitted to indicate that an ambulance was required. The transmitter could well transmit a simple pulse code which would be indicative of the location of the transmitter and this code would, of course, be sent over the respective channel selected.

The central receiving station for one channel could as mentioned above be located at a convenient service station whilst the central receiving station for the other channel could well be located at the nearest hospital or ambulance depot. Similarly, each highway patrol station in the vicinity could be provided with a receiver whereby emergency calls could be received at the highway patrol stations. In fact, receivers could be located at each service station and each highway patrol station along the particular stretch of highway.

Figure 1:
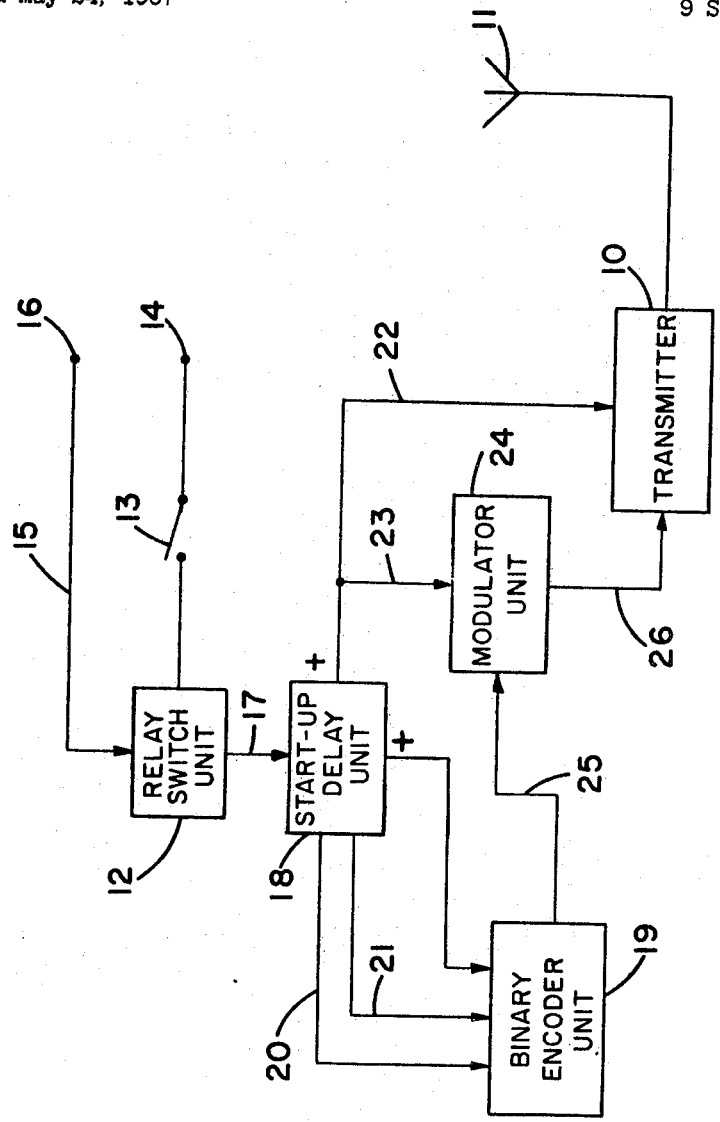
FIGURE 1 is a a block diagrammatic representation of one of the transmitter installations which may be located at intervals along a highway in accordance with the present invention.

Referring to FIGURE 1, there is a transmission installation which may be positioned at each of a plurality of spaced locations along a highway. Each transmitter installation includes a transmitter unit 10 for transmitting radio signals utilizing an antenna 11. It is to be appreciated that the term "radio" as used herein is in no way restrictive as to the frequency of the signals which may be transmitted in a system according to the present invention—any signals capable of transmission may, of course, be used with suitable modification to the system. The transmitter is caused to operate in response to the activation of a relay switch unit 12 which is itself activated by a manually operable "ON" button 13 connected to a source of positive voltage at terminal 14. The relay switch unit 12 similarly may be rendered inactive by means of an "OFF" button incorporated in another electrical connection 15 connected to a further terminal 16 to which a positive voltage supply is connected.

The relay switch unit 12 is operative to supply an output along a connection 17 to a start-up delay unit 18 which is capable of controlling the operation of a binary encoder unit 19 to which it is connected by a clock-start pulse connection 20 and a zero pulse connection 21. The start-up delay unit 18 is capable of supplying a positive voltage along a connection 22 to the transmitter unit 10 and a positive voltage along a connection 23 to a modulator unit 24 which is also capable of receiving an input from binary encoder unit 19 along a connection 25. The modulator unit 24 is capable of supplying an output along connection 26 to transmitter unit 10.

Figure 2:
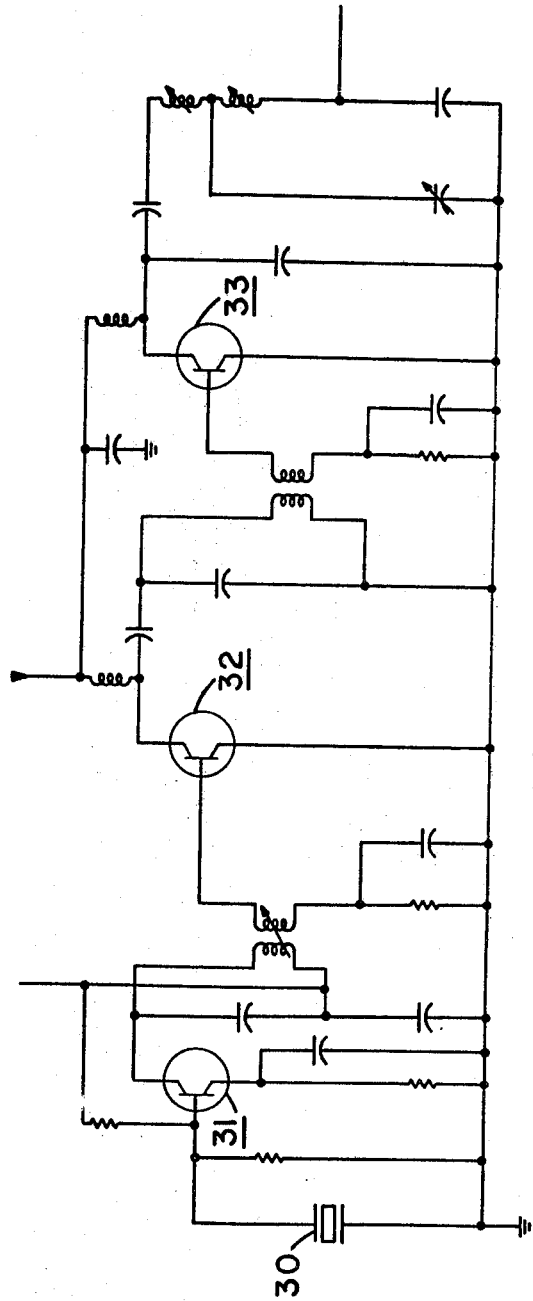
FIGURE 2 is a diagrammatic representation of the transmitter unit used in the installation shown in FIGURE 1.

In FIGURE 2, there is shown a more detailed representation of the transmitter unit 10 of FIGURE 1. The transmitter unit will be seen to be crystal-controlled by a crystal unit 30 and includes three transistor stages 31, 32 and 33. The operation of the transmitter unit shown in FIGURE 2 will not be described in detail as it will be apparent to a person skilled in this art.

Figure 3:
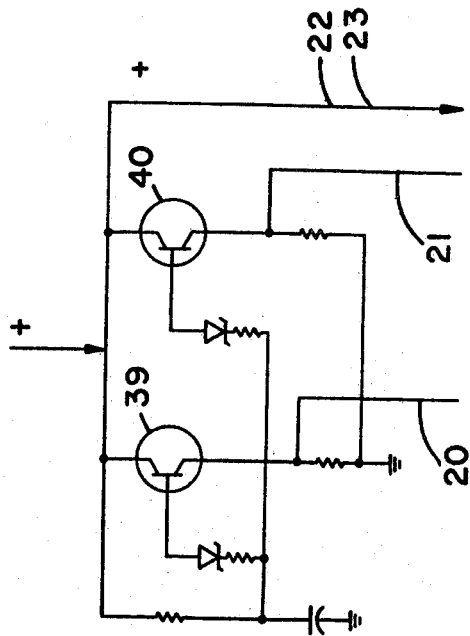
FIGURE 3 is a diagrammatic representation of the start-up delay unit used in the installation shown in FIGURE 1.

In FIGURE 3, the start-up delay unit 18 is shown in greater detail and will be seen to include two transistors 39 and 40 whose interconnection will be apparent. The output connections 20 and 21 are shown in FIGURE 3 as well as the connection having a positive supply thereon which is connected to connections 22 and 23 (FIGURE 1).

Figure 4:
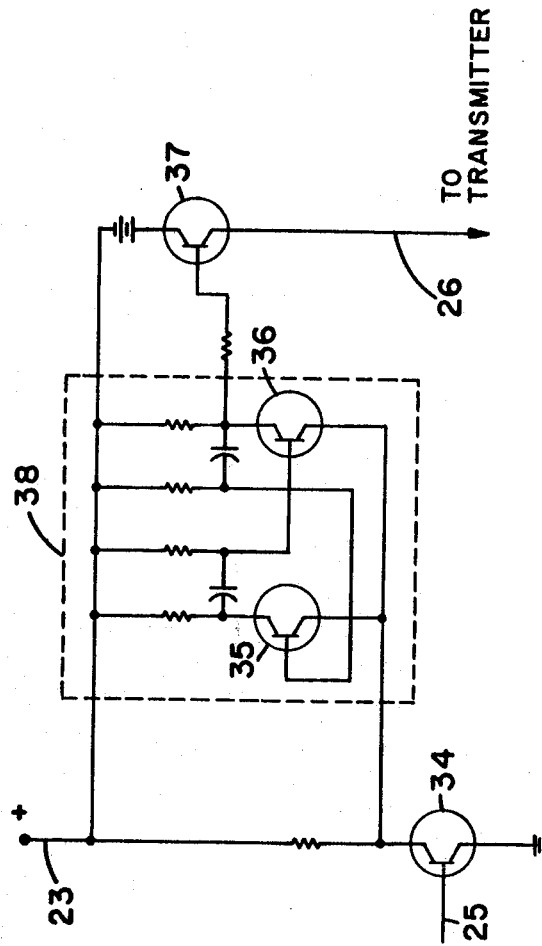
FIGURE 4 is a diagrammatic representation of the modulator unit of FIGURE 1.

In FIGURE 4, it will be seen that the modulator unit 24 (FIGURE 1) includes four transistors 34, 35, 36 and 37. Transistor 34 is arranged to act as an amplifier, transistors 35 and 36 are interconnected to form a multi-vibrator unit 38 capable of producing a square wave output at, for example, 857 cycles/second, whilst transistor 37 is a power output amplifier. The amplifier stage 34 provides power to the base of the multi-vibrator transistors 35 and 36 when energized by a pulse from the encoder unit 19 (FIGURE 1) along connection 23. The multi-vibrator unit 38, in turn, activates the biased power transistor 37 when the transistor 36 is conducting. This power output, after filtering, becomes the power supply for the last two amplification stages of the transmitter and is supplied thereto along connection 26. The input to the modulator unit is via connection 23 whilst the output is via connection 26.

It is to be noted that, where possible, the same reference numerals are used for the same parts where these parts occur in different figures.

Figure 5:
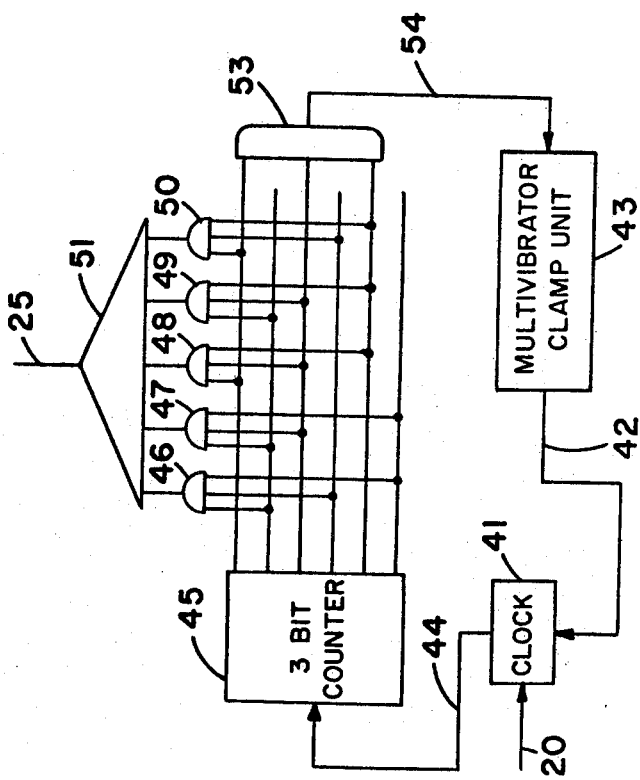
FIGURE 5 is a diagrammatic representation of the binary encoder unit used in the transmitter installation of FIGURE 1.

In FIGURE 5, the binary encoder unit will be seen to include a clock unit 41 capable of being initiated by a pulse along the connection 20 and is capable of being rendered inactive by an output along connection 42 from an astable multi-vibrator clamping unit 43 having a one to five minute period. An output from the clock pulse unit 41 is supplied along a connection 44 to a three bit counter unit 45 controlling the switching of gates 46, 47, 48, 49 and 50. These gates are effective to provide the required code for the transmitter location through an amplifier unit 51 along output connection 25 to the modulator unit 24 (FIGURE 1).

Figure 6:
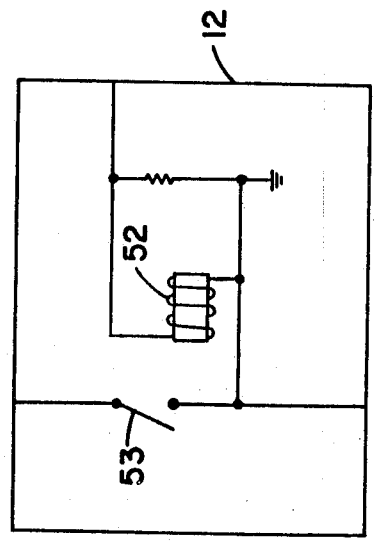
FIGURE 6 illustrates diagrammatically the relay unit used in the installation illustrated in FIGURE 1.

In FIGURE 6, there is shown the relay unit 12 in greater detail and it will be seen to include a relay winding 52 and a relay contact 53 with appropriate connections.

Figure 7:
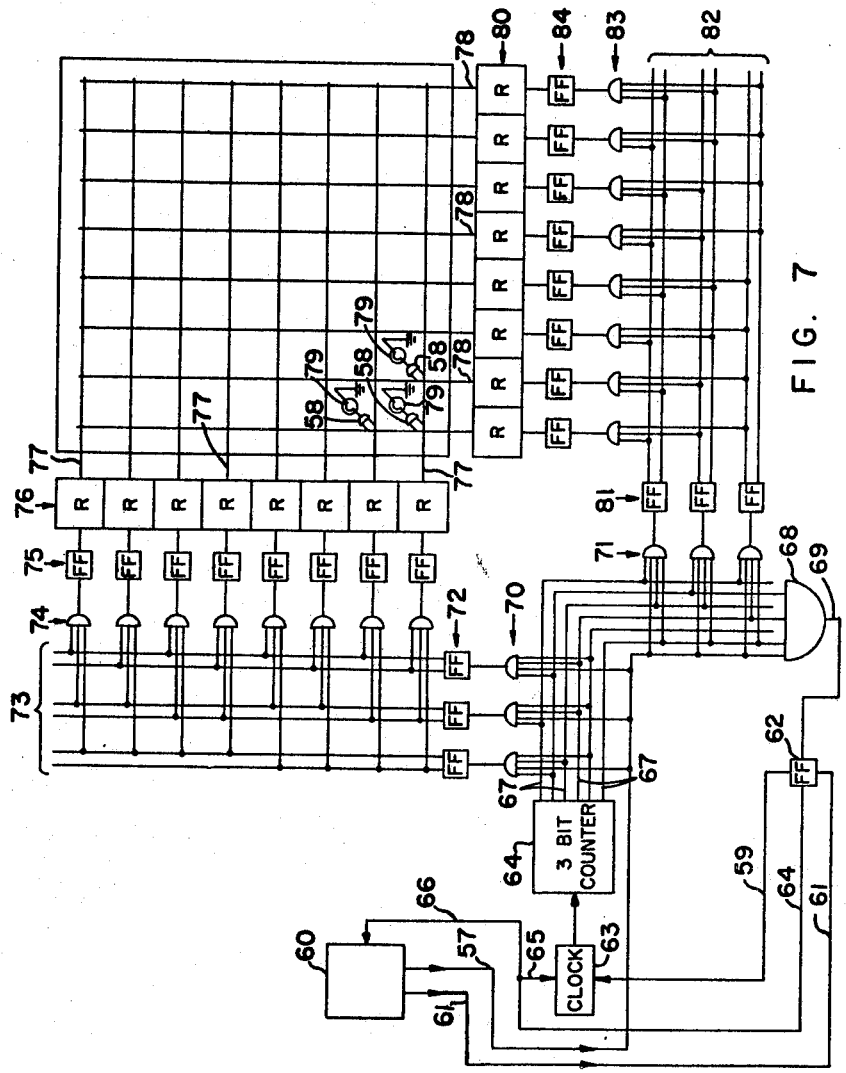
FIGURE 7 is a diagrammatic representation of part of the receiver located at a common receiving station for use with the transmitter installation of FIGURE 1 in an emergency highway calling system.

Part of a receiver unit for use in an emergency highway calling system according to the present invention is shown in FIGURE 7. It will be seen to include a citizens' band radio received 60 capable of supplying a start signal along connection 61 in response to a detected pulse to flip-flop unit 62. A clock counter unit 63 is also shown in FIGURE 7 together with a three bit counter unit 64.

The radio receiver 60 is also capable of supplying a positive output along a "sequence pulse detected" connection 57. It will be seen that an output from the flip-flop unit 62 is fed along a connection 64 to trigger the clock pulse unit 63 via connection 65 and is also supplied along connection 66 to the citizens' band radio receiver 60.

As will be seen from FIGURE 7, the outputs of the three bit counter 64 are fed along connections 67 to a three input AND gate 68 whose output is fed along connection 69 to flip-flop unit 62. The output of the three bit counter 64 is also fed to respective inputs of a first series of gates 70 and also to the respective inputs of a second series of gates 71. The output of each of the gates 70 is fed to a respective one of three flip-flops units 72 whose outputs are supplied along connections 73 to gate units 74, whose output, in turn, is supplied to respective flip-flop units 75. The output of each flip-flop unit is connected to the input of a respective one of a plurality of relay units 76 which are designed, on energization, to cause a voltage to be applied to a respective one of a plurality of wires 77 extending in one direction and forming part of a selection matrix. Wires extending in a direction at right angles to said one direction are identified as wires 78 in FIGURE 7. At the intersection of each of the wires 77 and 78, there is located a suitable bulb 79 which will be illuminated when a potential exists between its respective wire 77 and its respective wire 78. In this way, any particular one of the electric lamps 79 may be selectively illuminated in response to a potential being applied across its respective wire 77 and wire 78. Selection of the appropriate wires 77 and 78 is made, in a well known manner, in response to the appropriate code combination being received by the receiver 60 and activating the succeeding circuits. Each electric lamp when illuminated is indicative of an alarm signal haivng been originated at a respective transmitter location and in this way, the particular transmitter location may be readily identified.

The wires 78 have a potential applied thereto in response to the energization of a respective one of a plurality of relay units 80. Activation of relay units 80 is actually effected as a result of a particular code combination appearing on the above-mentioned gates 71 whose outputs are connected to the inputs of flip-flop units 81 as shown in FIGURE 7. The outputs of flip-flop units 81 are supplied along connections 82, in a combination determined by the code used, to flip-flop units 84 whose outputs are supplied to the respective inputs of relay units 80. In this way, any one or more of the wires 78 may be selected as required by the received code combination.

In use, the system according to the present invention may be installed so as to provide an emergency calling system for a highway. One of each of a plurality of transmitter installations is installed at a particular location along a highway at a distance from the next transmitter installation. A receiver installation according to the present invention is then located at the nearest service station whilst a further receiver installation according to the present invention is located at the nearest hospital. If an accident occurs on the highway or if a car travelling along the highway is in sudden need of repair, then it is only necessary for someone to go to the nearest transmitter installation to call the required service truck or ambulance. As mentioned above, the transmitter installations may well be installed in casings such as are used for parking meters.

At the transmitter installation, the user will see two buttons. By pressing the first button, he initiates a sequence of events whereby a signal is given to the nearest service station indicating by the above mentioned code which transmitter location has been activated. The service station can then send out a service truck to render the necessary assistance. If the user requires an ambulance, he presses the second button at the transmitter installation and this emits a signal on a second channel for reception by the receiver at the nearest hospital or ambulance depot. Once again, the coded information in the signal is translated by the receiver installation and an ambulance can be sent to that particular transmitter installation. In this way, assistance is available to road users.

In the described embodiment, the transmitter portion of the system produces up to 8 sequential pulses at a frequency of 27 mHz./sec. which are amplitude modulated by a square wave at, for example, 857 cycles/second. The first pulse is, of course, always present and is utilized in the receiver (FIGURE 7) to alert the receiver installation. Pulses 2 to 7 contain the information giving the actual location of the respective transmitter whilst pulse 8 is the gap between adjacent groups of pulses.

Referring to FIGURE 1, the transmitter is usually switched off due to the setting of the relay switch unit which controls all the operating power for the transmitter installation. When the ON button is pressed, the relay switch unit is switched to a permanent ON position so long as the respective OFF button is not pushed. Pushing of the OFF button removes power from the transmitter installation.

Activation of the relay switch unit 12 results in activation of the start-up delay unit 18 which results in a pulse being initiated to clamp the clock stage 41 (FIGURE 5) and the binary counter 45 in their start positions. The counter unit 45 and the clock pulse unit 41 are then released in that order and commence counting and generating clock pulses respectively.

Once in operation, the binary encoder unit (FIGURE 5) operates so that the three bit counter unit 45 cycles from binary number 0 to binary number 7. One of the AND circuits 46 to 50 is set so that a pulse is provided at its output when the binary counter 45 registers 0. The other AND circuits provide output pulses for specific binary numbers in the three bit counter or register 45, such as 4, 6, 3, etc. Thus, the transmitter output is controlled so as to correspond to the required combination of output pulses corresponding to a particular binary number. The OR gate 51 takes the output pulses from any one of the AND gates 46 to 50 and supplies an output directly to the input of the amplifier stage 34 (FIGURE 4) in the modulator unit 24 along connection 25. A final AND gate circuit 53 (FIGURE 4) provides an output along connection 54 whenever the binary number 7 is present at the output of the counter or register 45. An output along connection 54 energizes a monostable multi-vibrator unit 43 having a long period of several minutes. The monostable multi-vibrator unit 43 operates to clamp the clock pulse unit 41 for the said long period.

The modulator unit 24 (FIGURE 1) is shown in greater detail in FIGURE 4 and comprises an amplifier stage 34, a multi-vibrator stage 38 and a power output amplifier stage 37. The amplifier stage 34 provides an output to the multi-vibrator transistors 35 and 36 when it is energized along connection 25 by a pulse from the encoder unit 19. When the right-hand transistor 36 is conducting, then the biased power transistor 37 is activated in turn and provides a power output along connection 26 which, after suitable filtering, becomes the power supply for the last two amplification stages of the transmitter unit 10. These are not shown in detail but their construction will, of course, be apparent.

Referring to the receiver and decoder system as shown in FIGURE 7, the CB receiver 60 receives a signal transmitted by one of the transmitters 10 (FIGURE 1) at a transmitter installation and since this is of the correct frequency and modulation, a "signal detected pulse" is provided on connection 62 (FIGURE 7). This sets the flip-flop stage 61 into an ON position and as a result, the clock pulse unit 63 is activated via connection 59. The pulses thus produced by the clock pulse unit 63 are stored in the three bit register counter 64 which counts from 0 to 7. As each bit combination appears in the register 64, it supplies an output to the respective one of the AND gates 70 or 71. If a "sequence pulse detected" positive signal is, at the same time, present on connection 57 which is also connected to the AND gates 70 and 71, then the respective AND gate circuit is activated to provide an output to a respective one of the flip-flop units 72 or 81. The flip-flop units 72 and 81 are each designed to remain on once set, until they are turned off by the eighth pulse as mentioned below.

Referring to FIGURE 7, it will be seen that one of the flip-flop units 72 is on at the same time as one of the flip-flop units 81 due to activation of the respective gates. Therefore, for each combination, one of the flip-flop stages 75 and one of the flip-flop stages 84 is energized by their respective gate 74 or 83. The selected pair corresponds to a particular combination and operates to activate a pair of relays one being in the set of relays 76 and the other being in the set of relays 80. In this way, one conductor wire in the set 77 and one conductor wire in the set 78 has a voltage applied to it and the corresponding one of the gate circuits 58 is activated so as to apply a voltage to the respective lamp 79. Thus, the selected lamp 79 is illuminated to indicate which of the plurality of transmitter installations is transmitting an emergency call signal as a result of the corresponding ON button (FIGURE 1) having been pressed. Thus, the appropriate emergency action may be taken.

When the above-mentioned eighth pulse is received by the AND gate 68 (FIGURE 7), this causes the flip-flop unit 62 to be energized OFF position. Therefore, flip-flop stage 62 switches off the clock pulse generator 63 by way of connection 64, resets flip-flop stages 72 and 81 to their OFF position and also resets the citizens' band radio receiver 60, via connection 66 to wait for the next received signal from a transmitter installation.

Figure 8:
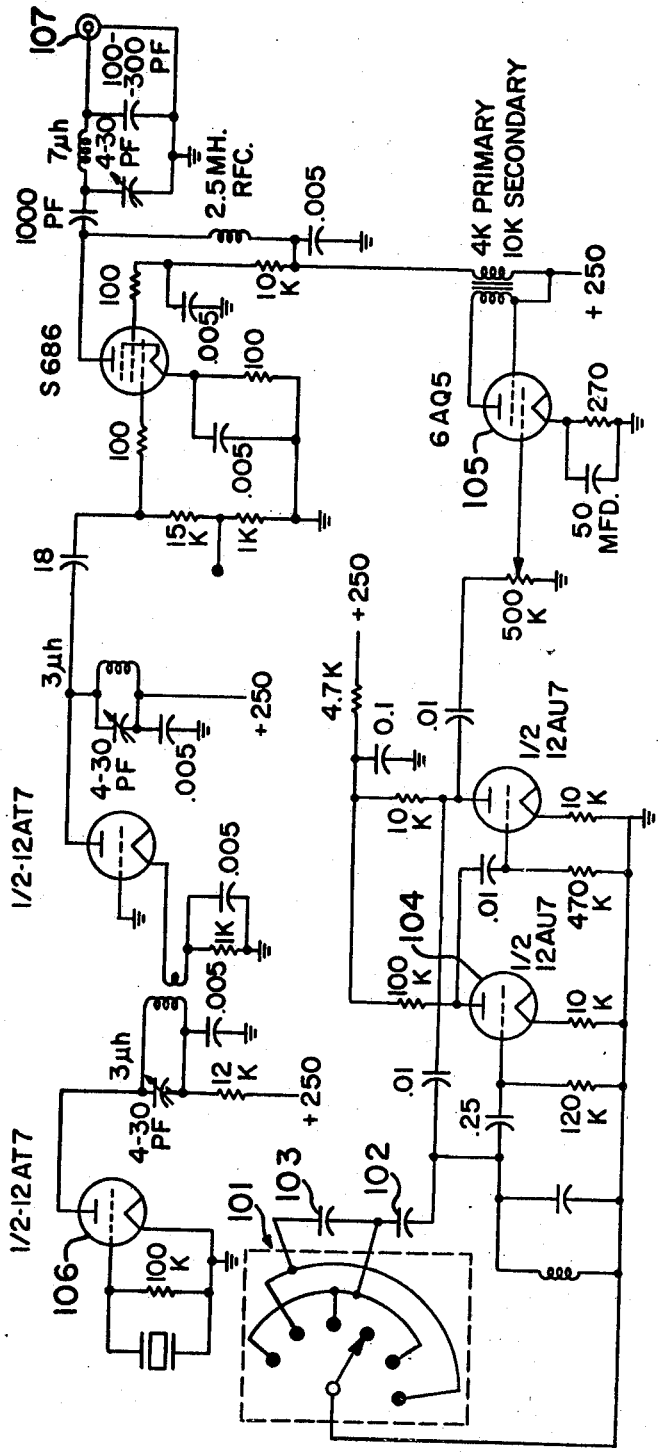
FIGURE 8 is a diagrammatic representation of an alternative circuit of part of a transmitter unit for use in an emergency highway calling system having a transmitter installation such as shown in FIGURE 1.

In FIGURE 8, there is shown a block schematic representation of the circuit for an alternative transmitter for use at the transmitter installations located at intervals along a highway. The transmitter shown is a five watt citizens' band transmitter which will not be described in detail as its construction and operation will be apparent. However, the circuit will be seen to include a third overtone crystal 100 connected in an appropriate oscillator stage and also a motor or stepping switch 101 with associated capacitors 102 and 103, etc.

In operation, the vacuum tube radio transmitter shown in FIGURE 8 operates so that the stepping switch 101 selects the respective capacitors in sequence to determine the pitch of the signal generated by the audio oscillator stage 104 which generates the respective code signal identifying the position of the transmitter installation. This signal is supplied to a modulator stage 105 which amplitude modulates the radio frequency signal generated by an RF oscillator and amplifier stage 106. The output of the transmitter is supplied to the respective antenna system by an antenna terminal 107.

Figure 9:
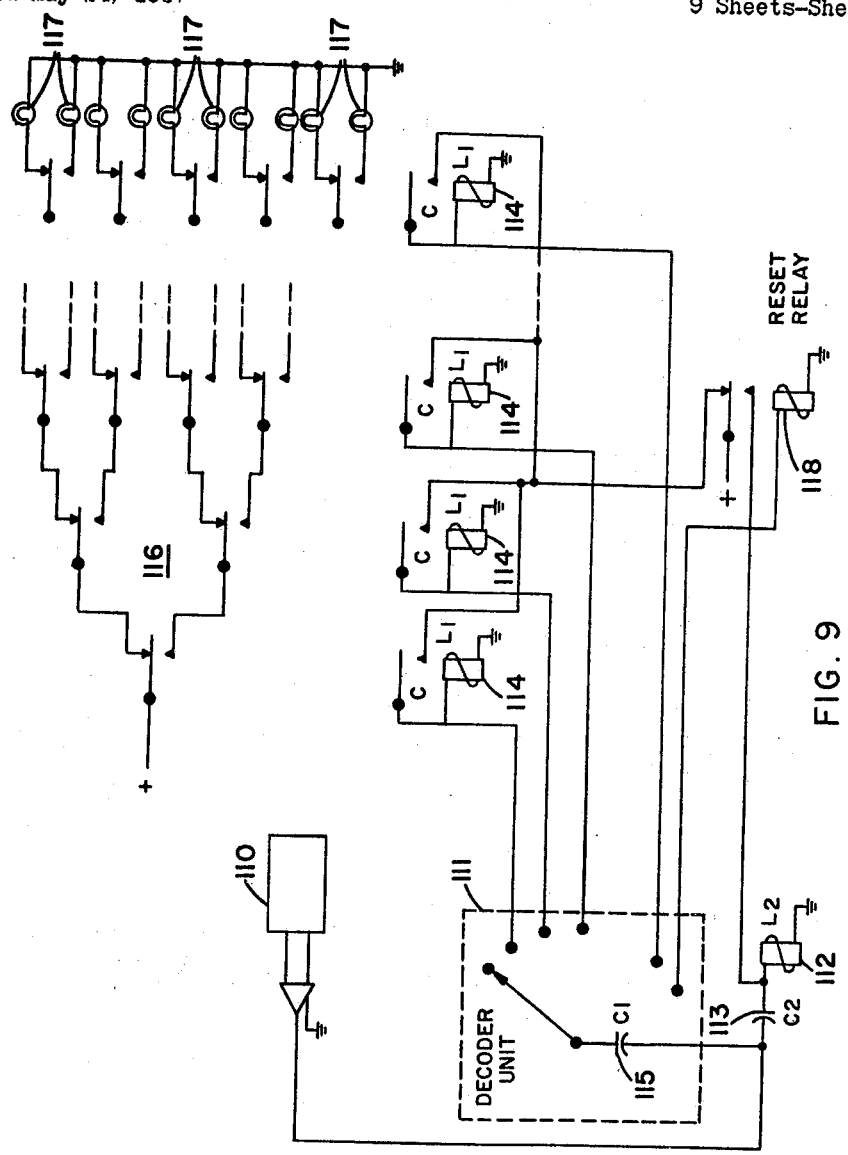
FIGURE 9 is a diagrammatic representation of an alternative circuit for use in a receiver unit in an emergency highway calling system.

In FIGURE 9, there is shown a diagrammatic representation of the circuit of a receiver which may be utilized in a system incorporating a plurality of transmitter installations utilizing the transmitter illustrated in FIGURE 8. The construction of the circuit will be apparent and will be seen to include a citizens' band receiver 110 and a decoder unit 111 incorporating a motor-type stepping switch having an inductance coil 112 and associated capacitor 113. A series of further relay coils 114 and a further capacitor 115 will also be seen associated with the stepping switch of the decoder unit 111. A switching network 116 is also included in the circuit shown in FIGURE 9, together with a plurality of indicating lamps 117.

A reset relay 118 is also indicated in FIGURE 9.

The capacitor 115 determines the signal frequency $f_1$ whilst the capacitor $c_2$ determines the interval switching frequency $f_2$. The relay coil 112 is a type-45 (step-on-release) automatic electric stepping switch whilst the relay 114 is a 28-volt Clare relay set.

In operation, in response to transmission from a transmitter installation, the receiver 119 receives the emergency signal and provides an audio output which is amplified in the associated audio frequency power amplifier shown and the amplified signal is fed to the decoder unit 111. Whenever a modulation signal has a frequency corresponding to the resonant frequency determined by the stepping switch coil inductance 112 and capacitor 113, then the stepping switch unit 111 will advance one step. If a signal with a frequency corresponding to the resonance condition determined by the relay inductance 114 and capacitor 115 is present when the stepping unit 111 is at a non-zero position, then the relay 114 for that position will be activated and the respective contact locked in place. The selected pattern of locked relays will determine, by way of the switching network 116, which one or more of the indicating lamps 117 is illuminated. Activation of the reset relay 118 will unlock all the relays ready to restart the cycle on receipt of the next emergency call signal.

In the above-described embodiments, it will be appreciated that any suitable code may be used. To prevent interference from other radio transmitters opearting on the same frequency channels, the pulses could consist of radio frequency energy pulses amplitude modulated by a sign wave of, for example, 4 kilohertz/sec. The receiver would then demodulate this signal and feed it into the respective resonant circuit tuned for the modulation of frequency. Since neither voice nor Morse code transmitters modulate their radio frequency carriers with frequencies as high as 4 Hz./sec., there would be no problem in false alarm signals from those sources. Similarly, the emergency signals would not interfere with the use of other frequencies for normal communication purposes.

In the receiver, the signal is demodulated and fed into a tuned circuit adapted to recognize the particular pulse modulation signal. The threshold device at the output of the tuned circuit feeds the decoder unit.

As will be appreciated, the pushing of the respective button at the transmitter installation causes an "active" pulse to be transmitted and received by the receiver. This initiates a digital timer in the receiver decoding circuit and the timer sequentially steps through the code in seven or more intervals. In each interval, a pulse output is either delivered or not delivered and the resultant pattern of pulse intervals is indicative of the location of the respective transmitter installation. This is, in turn, interpreted by the automatic decoder unit which activates a respective lamp on a map or list panel whereby the location of the transmitter is determined. For example, if a pulse is represented as a 1 and the absence of a pulse with a 0, then the transmitted decoded information would be as follows for three different transmitter installations at different distances from a reference point:

Activate: Address
1 _ _ _ _ _ 000001 address of station 1 or mile 420.08.
1 _ _ _ _ _ 000010 address of station 2 or mile 420.52.
1 _ _ _ _ 000011 address of station 3 or mole 420.88.

The use of six pulse positions permits the handling of 26 equals sixty-four possible addresses or transmitter installation locations. However, the address 0000000 would not be used and, therefore, there would, in fact, be sixty-three positions available per service area. If it is necessary to provide more than sixty-three transmitter installation locations, then, of course, more than six code positions would be provided.

To prevent confusion between adjacent service areas, different modulation frequencies could be used for the different service areas.

The above embodiments have been described with reference to a highway emergency call installation. However, it will be appreciated that the invention is not restricted thereto but is equally applicable to other uses such as, for example, a fire alarm emergency call system.

I claim:

1. An emergency calling system for permitting an emergency signal to be sent from any one of a plurality of spaced locations to a common receiving station comprising:

(a) a radio transmitter installation located at each of said locations;
   (b) a radio receiver located at said receiving station and capable of receiving radio signals transmitted by said transmitter installations;
   (c) said radio signals each including coded information representative of the respective transmitter emitting the received radio signals whereby each respective transmitter is indentifiable at said common receiving station by a respective one of a plurality of indicating devices;
   (d) said receiver including a clock pulse generating unit operational in response to a start signal corresponding to the reception of said radio signals to supply clock pulses to a counter having a plurality of output connections;
   (e) said clock pulses causing said counter to produce successive code combination pulse groups, the pulses of each group being on a corresponding selected number of said output connections in dependence on the respective code combination pulse group, each pulse group corresponding to the coded information from a different transmitter;
   (f) a first and a second plurality of coincidence AND gates each having one input connected to a common control line and a further plurality of inputs connected to said output connections whereby a respective one of said first plurality of coincidence gates and a corresponding one of said second plurality of coincidence gates are responsive to a different code combination pulse group occurring in coincidence with a respective signal on said common control line;
   (g) the output of each of said first plurality of coincidence gates being connected each through one of a first set of flip-flop devices to a separate one of a first plurality of conductive wires;
   (h) the output of each of said second plurality of gates being connected each through one of a second set of flip-flop devices to a separate one of a second plurality of conductive wires;
   (i) said first and second plurality of conductive wires being electrically connected so as to form a matrix; and
   (j) each of said indicating devices being electrically connected between a wire of said first plurality of wires and a wire of said second plurality of wires whereby, on energization of a respective flip-flop device of said first set and a flip-flop device of said second set, a respective indicating device is activated to indicate a particular transmitter installation.

2. An emergency calling system according to claim 1 wherein each indicating device is a lamp capable of illumination to indicate said particular transmitter installation.

3. An emergency calling system according to claim 1 wherein each transmitter installation includes:
 (a) a transmitter unit for transmitting radio signals via an antenna system;
 (b) a binary encoder unit for supplying coded information representative of the transmitter location to said transmitter for transmission;
 (c) a modulator unit interposed between said binary encoder unit and said transmitter unit for modulating the transmitter output with said coded information; and
 (d) a controllable relay switch unit adapted to initiate operation of said binary encoder unit and said transmitter unit for transmission of said emergency signal.

4. An emergency highway calling system for permitting an emergency signal to be sent from any one of a plurality of spaced locations along a highway to a common receiving station comprising:
 (a) a radio transmitter installation located at each of said locations;
 (b) a radio receiver located at said receiving station and capable of receiving radio signals transmitted by said transmitter installations;
 (c) said radio signals each including coded information representative of the respective transmitter emitting the received radio signals whereby each respective transmitter is identifiable at said common receiving station by a respective one of a plurality of indicating devices;
 (d) said receiver including a clock pulse generating unit operational in response to a start signal corresponding to the reception of said radio signals to supply clock pulses to a counter having a plurality of output connections;
 (e) said clock pulses causing said counter to produce successive code combination pulse groups, the pulses of each group being on a corresponding selected number of said output connections in dependence on the respective code combination pulse group, each pulse group corresponding to the coded information from a different transmitter;
 (f) a first and a second plurality of coincidence AND gates each having one input connected to a common control line and a further plurality of inputs connected to said output connections whereby a respective one of said first plurality of coincidence gates and a corresponding one of said second plurality of coincidence gates are responsive to a different code combination pulse group occurring in coincidence with a respective signal on said common control line;
 (g) the output of each of said first plurality of coincidence gates being connected each through one of a first set of flip-flop device to a separate one of a first plurality of conductive wires;
 (h) the output of each of said second plurality of gates being connected each through one of a second set of flip-flop devices to a separate one of a second plurality of conductive wires;
 (i) said first and second plurality of conductive wires being electrically connected so as to form a matrix; and
 (j) a plurality of indicating devices, each electrically connected between a wire of said first plurality of wires and a wire of said second plurality of wires whereby, on energization of a respective flip-flop device of said first set and a flip-flop device of said second set, a respective indicating device is activated to indicate a particular transmitter installation.

5. An emergency highway calling system for permitting an emergency signal to be sent from any one of a plurality of spaced locations along a highway to a common receiving station comprising:
 (a) a radio transmitter installation located at each of said locations;
 (b) each radio transmitter installation including a transmitter unit, a binary encoder unit for supplying coded signals through a modulator unit for transmission by said transmitter unit and a manually operable button for initiating operation of said binary encoder unit and said transmitter unit;
 (c) said binary encoder unit including a clock pulse generating unit for causing a three bit counter unit to proceed through a cycle to produce a predetermined code combination of pulses, a plurality of AND gates for controlling the modulator unit in accordance with said predetermined code combination of pulses;
 (d) said transmitter unit including a plurality of transistor stages and a frequency determining crystal;
 (e) a radio receiver located at said receiving station and capable of receiving radio signals transmitted by said transmitter installations;
 (f) said radio signals each including coded information representative of the respective transmitter emitting the received radio signals whereby each respective transmitter is identifiable at said common receiving station by a respective one of a plurality of indicating devices;
 (g) said receiver including a clock pulse generating unit operational in response to a start signal corresponding to the reception of said radio signals to supply clock pulses to a counter having a plurality of output connections;
 (h) said clock pulses causing said counter to produce successive code combination pulse groups, the pulses of each group being on a corresponding selected number of said output connections in dependence on the respective code combination pulse group, each pulse group corresponding to the coded information from a different transmitter;
 (i) a first and a second plurality of coincidence AND gates each having one input connected to a common control line and a further plurality of inputs connected to said output connections whereby a respective one of said first plurality of coincidence gates and a corresponding one of said second plurality of coincidence gates are responsive to a different code combination pulse group occurring in coincidence with a respective signal on said common control line;
 (j) the output of each of said first plurality of coincidence gates being connected each through one of a first set of flip-flop devices to a separate one of a first plurality of conductive wires;
 (k) the output of each of said second plurality of gates being connected each through one of a second set of flip-flop devices to a separate one of a second plurality of conductive wires;
 (l) said first and second plurality of conductive wires being electrically connected so as to form a matrix; and
 (m) each of said indicating devices being electrically connnected between a wire of said first plurality of wires and a wire of said second plurality of wires whereby, on energization of a respective flip-flop device of said first set and a flip-flop device of said second set, a respective indicating device is activated to indicate a particular transmitter installation.

6. An emergency calling system according to claim 5 wherein each indicating device is a lamp capable of illumination to indicate said particular transmitter installation.

References Cited

UNITED STATES PATENTS

| | | | |
|---|---|---|---|
| 3,080,547 | 3/1963 | Cooper | 325—55 |
| 3,175,191 | 3/1965 | Cohn | 325—55 |
| 3,292,178 | 12/1966 | Magnuski | 325—55 |
| 3,371,278 | 2/1968 | Gelushia et al. | 325—64 |
| 3,387,101 | 6/1968 | Skiles | 325—64 |

JOHN W. CALDWELL, Primary Examiner

ALBERT J. MAYER, Assistant Examiner

U.S. Cl. X.R.

325—54; 340—32